2,166,450

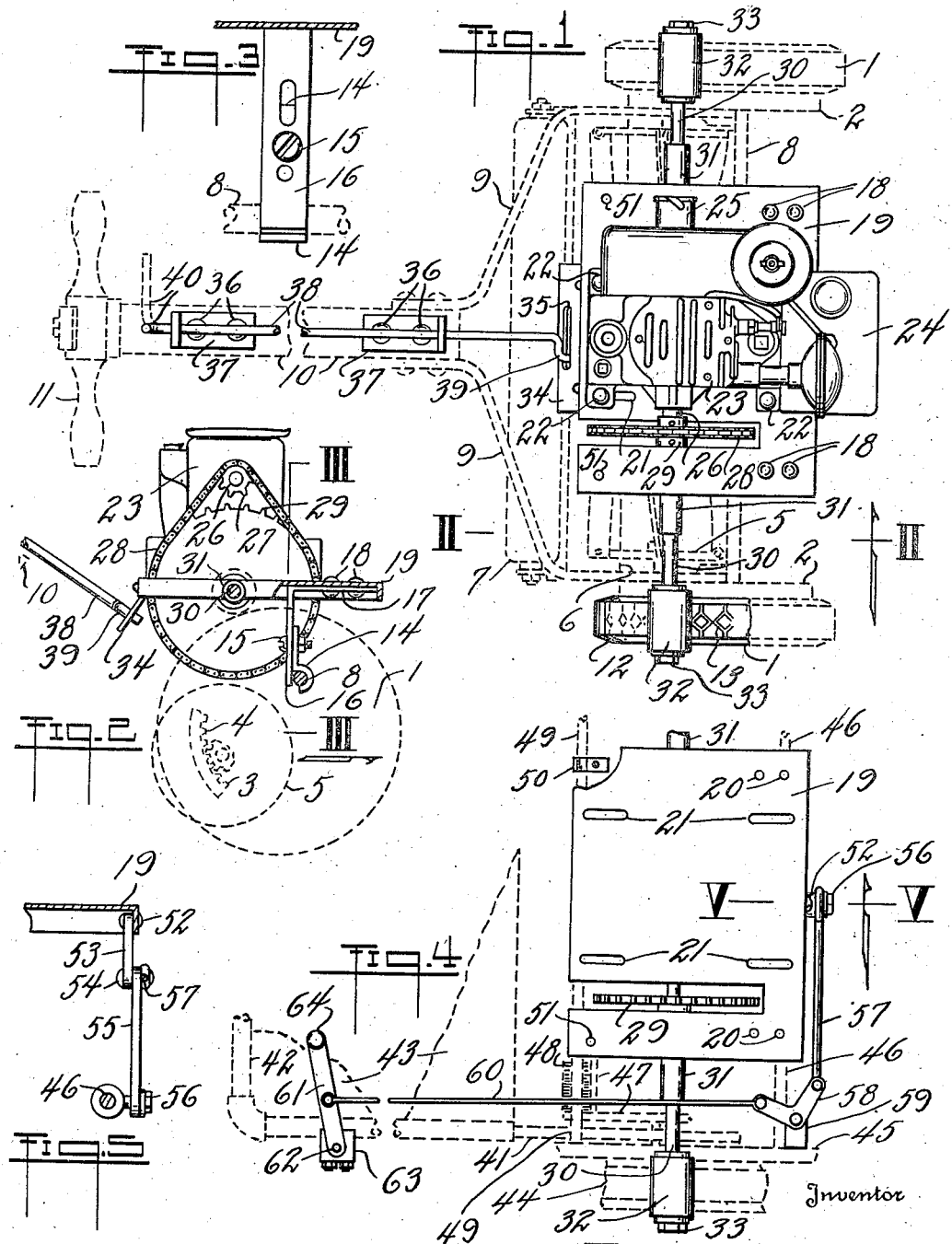
July 18, 1939.    F. B. SMALLEY    2,166,450
ADAPTABLE MOUNTING FOR PRIME MOVERS TO ACT ON GROUND WHEELS
Filed Nov. 3, 1938
Inventor
Frazey B. Smalley
By
Attorney Patented July 18, 1939

UNITED STATES PATENT OFFICE 2,166,450

ADAPTABLE MOUNTING FOR PRIME MOVERS TO ACT ON GROUND WHEELS

Frazey B. Smalley, Toledo, Ohio

Application November 3, 1938, Serial No. 238,565

2 Claims. (Cl. 180—19)

This invention relates to tool propulsion adaptation and control.

This invention has utility when incorporated in general adaptability of prime mover to equipment otherwise normally hand drawn or pushed as for vehicles used as tools for work as about lawns and greens.

Referring to the drawing:

Fig. 1 is a plan view of the device shown as in mounting position for a lawn mower;

Fig. 2 is a section on the line II—II, Fig. 1, showing the position of the device of Fig. 1 as to the ground wheels and transmission therefrom for the mower;

Fig. 3 is a section on the line III—III, Fig. 2, showing the adjustable bracket feature in general adaptation mounting for the deck of the device carrying the prime mover;

Fig. 4 is a fragmentary plan view of the tool propulsion device as in position on a lawn type of tool serving wherein the reel in lieu of cutter blades carries brushes; and Fig. 5 is a view on the line V—V, Fig. 4, showing the control feature therefor.

A lawn mower of general type is provided with ground wheels 1 in gear frame 2 provided with teeth 3 effective to act on pinion 4 to rotate cutter reel 5 as to cutter bar 6 carried with the gear frame 2 and located by ground roller 7. Parallel to this reel 5 and between the gear casings 2 at the wheels 1 is spacer bar 8. From these gear housings 2 extend arms 9, converging to tongue or bar 10 terminating in handle 11. The lawn mower may have its wheels 1 provided with rubber tires 12 having roughened tread 13.

Under the invention herein, claw 14, as adjusted by bolt 15 in bracket slotted arm 16, may be positioned for locating the claw 14 to engage the bar 8. This arm 16 of bracket 17 is attached by fastening devices 18 to deck 19. This deck 19 has holes 20 for these fastening devices 18 and additional slots 21 for bolts 22 to mount prime mover or gas engine 23 as a power device hereon.

This gas engine may have fuel supply 24. By pulling a cord about pulley 25, rotation of crank shaft 26 may be effective in starting the motor or prime mover gas engine. As thus cranked, it is effective through pinion 27 and sprocket chain 28 as a speed reduction to drive sprocket 29 on shaft 30, carried by bearings 31 fixed with the deck 19. This shaft 30 as extending away from the deck and parallel to the reel 5 has fixedly mounted terminally thereon rubber rollers 32 as anchored by attaching means 33. This shaft 30 is accordingly a live axle and as these friction wheels 32 are in contact with the rubber tires 12 of the wheels there is effected propulsion of the lawn mover, and, due to such propulsion on the ground wheels, an actuation of the cutter bar to effect mowing operation.

This deck 19 toward the handle 11 has offset 34 rigid with the deck 19 and with slot 35 therein. Fixed with the tongue or bar 10 by attaching means 36 is pair of brackets 37 as guides for rigid rock bar 38 having crank 39 operable in the slot 35 and offset handle 40 adjacent the handle 11, as an operator for this control. As this operator control 40 is thrown into parallelism or toward the plane of the handles 11, the crank 39 is shifted to lift the deck 19 on the side toward the handle 11 and thereby clear the rollers or wheels 32 from the wheels 1. As thus released there is no driving transmission from the gas engine on the deck 19 and the lawn mower may be directed at will independently of the motor propulsion. Accordingly, it may be withdrawn or moved at a desired speed forward. As there may be purpose to again bring about mowing action, it is only necessary to shift the terminus 40 of the control into the position up from the handle 11. The crank arm 39 is thereby rocked downwardly, allowing the deck to rock on the bar 8 and the wheels or rollers 32 to come into contact with the tires 12 and the wheels 1 for propulsion action forwardly of this vehicle or lawn mower at the speed of operation determined from the transmission. It is only necessary for the operator to direct the course for the propulsion.

In such travel, the height of the operator or the directing range as involving lateral movement or a range of movement up and down due to the inequalities or range of the lawn or golf green or course, need not disturb the position for propulsion, as there is a range for this freedom as away from the toggle-like position when the crank 39 is directly upward from the rod 39. However, when in such upward or out of use position, the range of handle flexion is not such as to bring the motor into position for operating this tool or land care equipment.

In lieu of tongue 10 to propel, there may be, instead of the offset of the fork arms 9, straight rearwardly extending arms 41 (Fig. 4) to handle 42, which may carry a gather or receiver 43. In this set-up, wheels 44 as having gear casing 45 and spacing rod 46 therebetween may be effective to drive reel 47 carrying brushes 48, as a sort of sweeper or rake in lieu of cutters. This operation of the brushes 48 is effective to elevate the material passed over into the receiver 43 in a manner similar to that which might be for a grass catcher were such directly following the mower, although this may be used to gather leaves in the event there be not importance in carrying on a gatherer during the mower operation.

In this set-up of the brush or sweeper, in addition to the spacer bar 46 there is parallel thereto spacer bar 49 from which clamp brackets 50 mount the deck 19, in lieu of the brackets 17 to deck 19, having attaching openings 51. There is accordingly omitted the brackets connected at the opening 20. There is attachment 52 (Fig. 5) for link 53 having pivot connecting pin 54 to link 55 as a toggle to pivotal connection 56 with spacing rod 46. This toggle, as up, holds the deck 19 in such position that friction rollers or wheels 32 are away from the tires of the wheels 44 and the prime mover mounted on the deck 19 is inactive. However, from the pivot pin 46 extends link 57 (Fig. 4) to angle lever 58 pivoted in bracket 59 at the gear housing 45. From the other arm of this angle lever 58 extends link 60 to lever 61 having pivot pin 62 mounted by clamp 63 to the arm 41. This lever 61 remote from the fulcrum pin 63 has grip 64.

Accordingly, the operator directing this vehicular tool from the handle 42 may conveniently engage the grip or handle 64 and shift such, herein shown as pull rearwardly or toward him, thereby causing the linkage as a rigid connecting device to break the toggle 53, 55, thus allowing the deck 19 to rock on the rod 49 and bring the friction driving wheels 32 in connection with the ground wheels or traction wheels 44 of the land care tool to effect propulsion thereof. As the device is thus manually in condition for directing or shifting as out of propulsion, it is only necessary to effect reverse movement to again bring into the propulsion stage for desired functioning.

It is seen, accordingly, that hereunder there is provided a prime mover mounting deck generally adaptable to vehicular tools or equipment for carrying of grass or leaves as well as gathering or cutting. Furthermore, this attachment as readily applicable is such that it may be convenient for control as only an accessory to the normal direction and functioning were the device or tool independent of such prime mover. Accordingly, it is a collateral and supplemental accessory promoting speed of care for golf courses, lawns of estates, and similar purposes.

Slots 21 in the deck 19 permit shifting of the prime mover as to the pivot point for rocking the deck, whereby the selected prime mover and its position may be appropriate for the effective functioning of the friction rollers 32 as to the wheels 1. This advantageous point is found to be below the high point and in the rear of the direction of rotation. The weight of the prime mover is thus efficiently effective for a slight shifting and does not materially detract from the mass location center of gravity as adjacent the axle line for the ground wheels. This is a contributing factor to ease in directing this motor driven tool. Accordingly, it is readily attached and detached in general application for a wide range of equipment for accurate setting and leveling, even in carts.

What is claimed and it is desired to secure by United States Letters Patent is:

1. For equipment having a pair of ground wheels, housing means locating the ground wheels in parallel, spacer bar means between the wheels, and a directing handle for steering the housing means, a deck, bracket means rigid with and depending from the deck between the wheels independent of the handle and mounting the deck to rock on the axis of said bar means, a prime mover mounted on the deck laterally of the bar means to load the deck to rock downward on said bar means axis, a shaft parallel to the axis of rotation of the wheels, friction wheels on said shaft for directly contacting the ground wheels, mounting means for the shaft fixed with and below the plane of the deck laterally from the axis of the bar means on the same side thereof as the prime mover to cause the loading of the deck to urge the traction wheels toward the ground wheels, speed reduction from the prime mover to the shaft, and transmission control means along the handle including a control part movable relatively to the handle to sustain the deck in a position to locate the friction wheels out of contacting relation with the ground wheels, said control being operable to shift said part away from sustaining the deck for the deck to rock on the bar means as an axis and thus bring the friction wheels against the ground wheels.

2. A prime mover mounting deck, bracket carrying means adapted for selective anchoring of the deck to conform to wheel support of a ground treating tool having directing means, a bracket rigid with, depending from and providing a rocking axis mounting for the deck, transmission from a prime mover carried by the deck including a shaft below said deck and friction wheels on said shaft spaced from directing means for the support, said spacing being from said axis on the same side as said prime mover, and a control coacting between the deck and support for throwing the prime mover out of vehicle propulsion position by lifting said traction wheels clear of the support wheels, said control including rigid means carried by the support away from the deck, extending directly to the deck, and there movable relatively to the deck for the deck to rock in response to the load and thereby bring the friction wheels into transmission effecting position with the support wheels.

FRAZEY B. SMALLEY.